US012118583B2

(12) United States Patent
Durvasula et al.

(10) Patent No.: US 12,118,583 B2
(45) Date of Patent: Oct. 15, 2024

(54) EVENT GAMIFICATION IN REAL TIME

(71) Applicant: American Express Travel Related Services Company, Inc., New York, NY (US)

(72) Inventors: Sastry V. Durvasula, Phoenix, AZ (US); Amit Prakash Gupta, Phoenix, AZ (US); Priyadarshini Koul, Scottsdale, AZ (US); Premkumar Manivannan, Phoenix, AZ (US); Sathish Muthukrishnan, Phoenix, AZ (US); Harish R. Naik, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/110,688

(22) Filed: Feb. 16, 2023

(65) Prior Publication Data
US 2023/0196403 A1    Jun. 22, 2023

Related U.S. Application Data (60) Division of application No. 16/823,246, filed on Mar. 18, 2020, now abandoned, which is a continuation of
(Continued)

(51) Int. Cl.
*G06Q 30/00*     (2023.01)
*A63F 13/65*     (2014.01)
(Continued)

(52) U.S. Cl.
CPC ......... *G06Q 30/0236* (2013.01); *A63F 13/65* (2014.09); *A63F 13/69* (2014.09);
(Continued)

(58) Field of Classification Search
CPC ................................. G06Q 30/0641
See application file for complete search history.

(56) References Cited

U.S. PATENT DOCUMENTS

2006/0101336 A1   5/2006 Edwards et al.
2010/0191594 A1*  7/2010 White ............... G06Q 40/12
                                              705/14.27
(Continued)

OTHER PUBLICATIONS https://books.google.com/books?id=LL59DwAAQBAJ&lpg=PP13&ots=13YMpJ72sG&lr&pg=PP13#v=onepage&q&f=false.*
(Continued)

*Primary Examiner* — Kathleen Palavecino
(74) *Attorney, Agent, or Firm* — Sterne, Kessler, Goldstein and Fox, P.L.L.C.

(57) ABSTRACT

A consumer may enroll in an event gamification system. An event listener may detect an event. The event gamification system may determine that the event qualifies for a game in which the consumer is enrolled. The event gamification system may transmit an achievement notification to the consumer as soon as the event occurs. The game may be displayed in a GUI on a consumer device. The consumer may be rewarded for completing the achievements in the game. Also, a server computer receiving a plurality of data sets that represent visually perceptible elements for a plurality of host web pages, wherein each of the plurality of host web pages displays an active link associated with a product on a merchant web page. The server automatically generating composite web page from: i) the particular data set associated with the particular host web page and the particular set of visually perceptible elements and ii) the related electronic content associated with the product from the merchant web page.

20 Claims, 3 Drawing Sheets

Related U.S. Application Data application No. 15/702,303, filed on Sep. 12, 2017, now abandoned.

(51) Int. Cl.
*A63F 13/69* (2014.01)
*A63F 13/79* (2014.01)
*G06Q 30/0207* (2023.01)
*G06Q 30/0226* (2023.01)
*G06Q 30/0601* (2023.01)
*A63F 13/71* (2014.01)

(52) U.S. Cl.
CPC ......... *A63F 13/79* (2014.09); *G06Q 30/0226* (2013.01); *G06Q 30/0239* (2013.01); *G06Q 30/0641* (2013.01); *A63F 13/71* (2014.09)

(56) References Cited

U.S. PATENT DOCUMENTS

| | | |
|---|---|---|
| 2012/0016726 A1* | 1/2012 | Mosites .............. G07F 17/3255 |
| | | 705/14.12 |
| 2012/0150695 A1 | 6/2012 | Fan et al. |
| 2012/0150759 A1* | 6/2012 | Tarjan .................... G06Q 30/02 |
| | | 705/1.1 |
| 2013/0054484 A1 | 2/2013 | Hoeflinger et al. |
| 2014/0073420 A1* | 3/2014 | Matthew ................ G06Q 30/02 |
| | | 463/29 |
| 2016/0232566 A1 | 8/2016 | Bonalle |
| 2017/0235783 A1* | 8/2017 | Chen .................. H04L 41/0894 |
| | | 707/691 |

OTHER PUBLICATIONS

Co-pending U.S. Appl. No. 16/823,246, filed Mar. 18, 2020, entitled "Event Gamification in Real Time," Inventors Sastry V. Durvasula et al. (Not Published).

* cited by examiner

EVENT GAMIFICATION IN REAL TIME

CROSS REFERENCE TO RELATED APPLICATIONS

This application is a divisional of, and claims priority to and benefit of, U.S. patent application Ser. No. 16/823,246 filed on Mar. 18, 2020, which is a continuation of U.S. patent application Ser. No. 15/702,303 filed Sep. 12, 2017 entitled "Event Gamification in Real Time," which are incorporated herein by reference in their entirety.

FIELD

The present disclosure relates to data management, and more specifically, to providing a graphical user interface with updates in real time based on data events.

BACKGROUND

Transaction account issuers often reward consumers for utilizing their transaction accounts. For example, transaction account issuers may provide loyalty points corresponding to an amount spent utilizing a transaction account. However, transaction account issuers typically provide rewards after monthly billing periods, and transaction account issuers are typically not able to provide an instant notification of rewards to consumers. Additionally, rewards are typically provided as simply a number of loyalty points, or a discount from a transaction or statement, which does not effectively engage the consumer.

SUMMARY

A system, method, and computer readable medium (collectively, "system") for event gamification is disclosed. The system may: detect, by an event listener, an event; transmit, by the event listener and in response to the detecting the event, the event to a gamification engine; parse, by an event manager in the gamification engine, the event into event attributes; determine, by a rules engine in the gamification engine and based on the event attributes and game rules stored in a rules database, that the event qualifies for a game; and transmit, by a notification engine in the gamification engine, and in response to the determining, an achievement notification to a consumer device.

In various embodiments, the system may transmit, by the rules engine, an API call to the rules database to obtain the game rules. The consumer device may display the achievement notification in a graphical user interface. The notification engine may transmit the achievement notification to the consumer device less than ten seconds after the event listener detects the event. The game may comprise a reward for completing a plurality of achievements. The system may unlock an additional game in response to the consumer completing the plurality of achievements. The system may apply the reward to a transaction account of the consumer in a batch process.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION OF THE DRAWINGS

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A system for transaction gamification is disclosed. A consumer may register with a transaction gamification system. The consumer may enroll in various games which provide rewards based on defined activities. A gamification database may store game rules and consumer data. An event listener may detect an event (e.g., in real time). For example, an event may be a purchase, a payment, a travel event, reaching a level, a purchase at a specific merchant, a purchase is a specific category (e.g., travel, entertainment, dining, shopping), a purchase in an identified geographical location, a purchase on a specific date or dime, a purchase using a specified payment mechanism (e.g. a digital wallet, Apple Pay®, Samsung Pay®), etc. An event manager may parse event attributes and pass the event attributes to a rules engine. The rules engine may compare (e.g., in real time) the event attributes with the game rules in the gamification database to determine whether the event qualifies with the game rules. A notification engine may transmit (e.g., in real time) a notification to a device of the consumer indicating that the event qualifies for at least one game in which the consumer is enrolled.

A consumer device may comprise a graphical user interface ("GUI"). The GUI may display the games in which the consumer is enrolled. In response to the rules engine determining that an event qualifies for one of the games, the GUI may display a badge, notification, or icon representing the event and showing progress in the game. The GUI may additionally display a notification describing what future events would help the consumer progress within one or more of the games.

Figure 1:
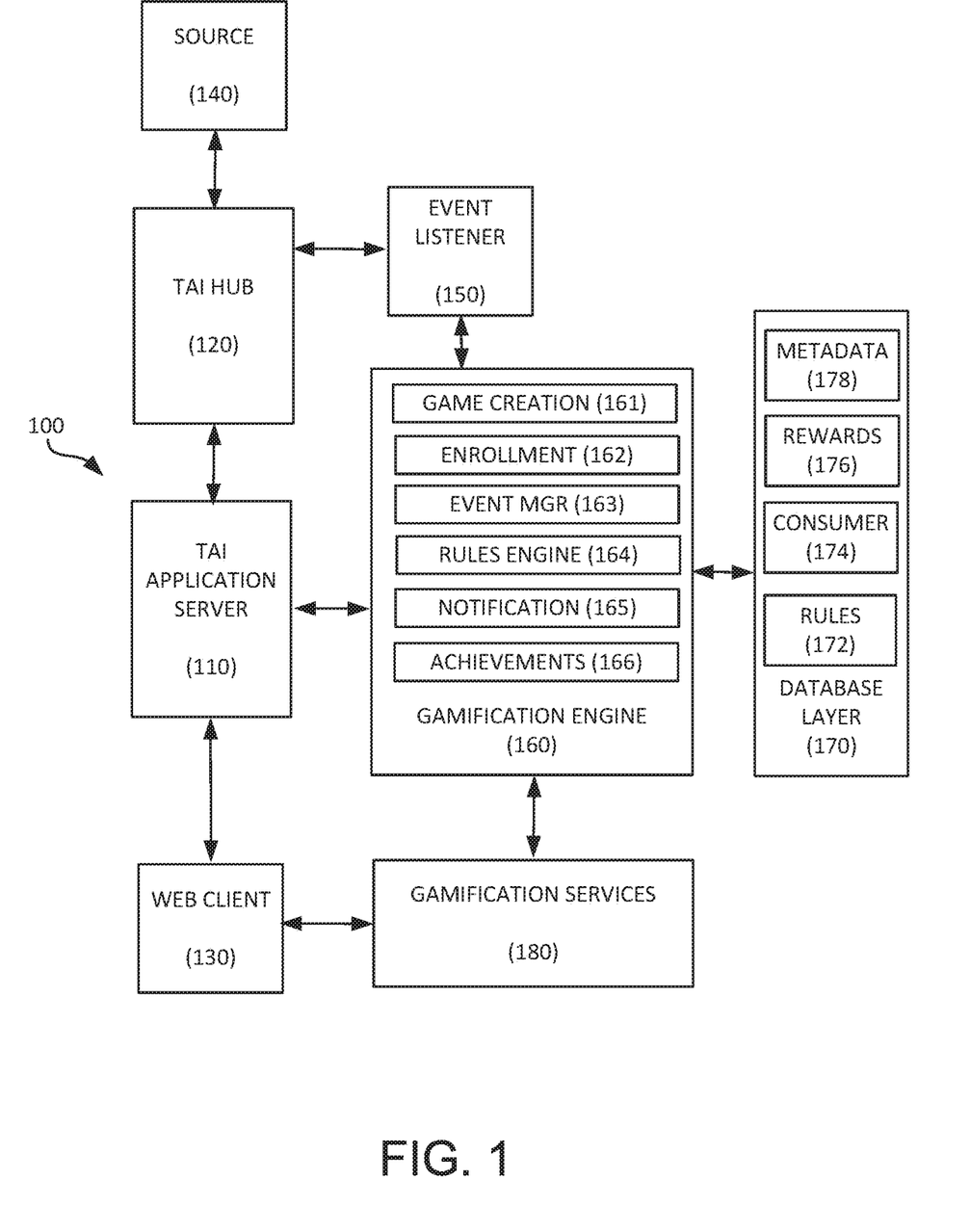
FIG. 1 illustrates various system components of a system for event gamification, in accordance with various embodiments.

Referring to FIG. 1, a system 100 for event gamification is illustrated according to various embodiments. The system 100 may comprise a transaction account issuer ("TAI") application server 110. The application server 110 may provide graphical user interface ("GUI"), such as a website or mobile application, which allows a consumer to interact with a TAI via a web client 130. For example, the TAI application server 110 may provide a website which allows a consumer to view account statements and make payments.

The system 100 may comprise a TAI hub 120. The TAI hub 120 may comprise one or more servers and/or databases which store events relevant to a consumer. For example, an event may be a financial transaction, a payment to a balance, creation of a new revolving account, travel information, etc. The TAI application server 110 may communicate with the TAI hub 120 in order to provide account information to the consumer and process payments from the consumer.

The TAI hub 120 may record events conducted by a source system 140. The source system 140 may be any system capable of generating an event, such a merchant point-of-sale ("POS"), a consumer device (e.g. smartphone) such as web client 130, a partner merchant server, etc.

Each time the datastore 180 records an event, an event listener 150 may detect the event. The event listener 150 may comprise a server or processor including code operating in a loop that is programmed to react in response to an input to the TAI hub 120. The event listener 150 may detect relevant events based on data elements in the event. For example, a transaction authorization may comprise tags or elements which indicate that the transaction authorization was initiated at a POS, a consumer device, or through an online website. A parsing module may parse the event into its event attributes, and may apply programmed criteria to identify a category of the event. In response to detecting the event, the event listener 150 may transmit the event and associated event attributes to a gamification engine 160.

The gamification engine 160 may comprise one or more servers, processors, databases, and API's. The various components of the gamification engine 106 may communicate with a gamification database layer 170 via a data access layer. The data access layer may comprise one or more API's that allow the components of the gamification engine 160 to retrieve data from and store data in the gamification database layer 170.

The gamification database layer 170 may comprise one or more databases. For example, a rules database 172 may store the rules for each game created by the gamification engine 160. A consumer database 174 may store the events which the consumer has completed which are relevant to the games in which the consumer is enrolled. A rewards database 176 may store the available rewards and issued rewards which are available for completing various games. A game metadata database 178 may store data about each of the games, such as analytic information including how many consumers are enrolled in games.

The gamification engine 160 may comprise a game creation engine 161. The game creation engine 161 may create rules for a new game. For example, the game may be a connect-the-dots game, in which each dot represents a restaurant category, and the consumer is awarded a badge for making a purchase at a restaurant in one of the categories. The event attributes may comprise unique values which are defined for each category. The gamification engine 160 may be programmed to map the unique values to the respective category in order to categorize the event. In response to the consumer receiving a badge for a certain number of dots in a row, the consumer 5 may be provided with a reward, such as a discount on their next restaurant purchase. The discount may be related to the restaurant category of the game or one of the restaurants in the game.

An enrollment manager 162 may allow consumers to enroll in a game. In response to the consumer indicating that they would like to enroll in a game, the enrollment manager 162 may transmit the consumer information to the gamification database layer 170, and the consumer information may be stored in the consumer database 174.

An event manager 163 may receive the event information from the event listener 150. The event manager 163 may parse the event information into its respective attributes. For example, for a purchase, the event manager 163 may parse the purchase into attributes including consumer identification, method of purchase (e.g. online, in person, phone), transaction account, transaction amount, geolocation of transaction, items purchased, date and time, merchant name, merchant category, transaction currency code, card product type, merchant industry code, unique transaction identifier, transaction approval or denial code, payment due date, card member name, card expiry date, transaction mode (e.g. swipe, chip, manual entry), event type, transaction internet indicator, digital wallet code, device type, gravity ID, POS entry mode, etc. In various embodiments, the event may be associated with hundreds or thousands of attributes. The event manager 163 may pass the event attributes to a rules engine 164.

The rules engine 164 may identify the consumer based on the event attributes and transmit an API call to the consumer database 174 to determine whether the consumer is enrolled in any games. If the consumer is not enrolled in any games, the rules engine 164 may stop processing the event, and the event may not be stored. In various embodiments, if the consumer is not enrolled in any games, the enrollment manager 162 may generate a message which a notification engine 165 may transmit to the consumer inviting the consumer to join a game.

If the consumer is enrolled in one or more games, the rules engine 164 may transmit an API call to the rules database 172 to retrieve the rules for the games in which the consumer is enrolled. The rules engine 164 may evaluate the event attributes with respect to the game rules to determine whether the event is eligible for one or more games. For example, the consumer may be enrolled in a game involving three event criteria, in which (1) a purchase (2) at a grocery store (3) over $50 qualifies for an achievement credit. In various embodiments, the rules engine 164 may evaluate all three criteria simultaneously, and if all three criteria are satisfied, the rules engine 164 may determine that the event is eligible. In various embodiments, the rules engine 164 may evaluate each criterion individually, and if any one criterion is not satisfied, the rules engine 164 may not evaluate the event any further.

If the event qualifies for a game, an achievements engine 166 may transmit an API call to the rules database 172 to determine what type of achievement the event qualifies for. In various embodiments, a single event may qualify for a reward. In such cases, the achievements engine may transmit an API call to the rewards database 176 to store the reward. The reward may be transmitted to the TAI hub 120 in order for the consumer to redeem the reward. In various embodiments, the event may qualify for an achievement, such as a badge, which does not qualify for an immediate reward, but may qualify for a reward if additional achievements are met.

The notification engine 165 may transmit a notification of the achievement to a gamification services layer 180. The gamification services layer 180 may comprise one or more servers, databases, processors, and API's. The gamification services layer 180 may define the format for a user interface on the web client 103. The user interface may provide a graphical representation of the games in which the user is enrolled. The gamification services layer 180 may transmit the achievement notification to the web client 180. In various embodiments, the achievement notification may be transmitted by a push notification, SMS message, email, or any other suitable method. In various embodiments, the total amount of time from the event occurring until the consumer receives the achievement may be less than one minute, or less than ten seconds. Because the event listener 150 may be transmitting events to the gamification engine 160 in real time, the consumer may receive the instant gratification of an achievement award for an event immediately after the event occurring. Thus, the consumer may receive the instant achievement award without updating software or hardware of a POS terminal itself In various embodiments, the gamification services layer 180 may also notify the consumer of a subsequent event that would qualify for an achievement and progress the consumer through the game and/or closer to receiving a reward. For example, the gamification services layer 180 may obtain information about the status of obtaining a reward, then transmit a notification that the only remaining activity required to obtain a reward is to make a purchase in a specific merchant category. Once the consumer has satisfied all of the achievements necessary to obtain the reward, the reward may be transmitted to the TAI hub 120. The TAI hub may be updated periodically, such as by running a batch operation once each night to incorporate all new data obtained throughout the day. Thus, the reward may be applied to a transaction account of the consumer by the next day as opposed to waiting until the end of a billing statement.

A consumer may interact with the system 100 utilizing one or more web clients 130. The consumer may use a web client 130 to view statements, make payments, view game status, and otherwise perform transaction account functions. The web client 130 may interact with TAI application server 110 in order for the consumer to make payments to the transaction account. In various embodiments, the web client 130 may comprise a mobile application, and the user may open the mobile application to interface with the TAI application server 110. In various embodiments, the web client 130 may comprise a touch screen interface, such that consumers may interact with the GUI by contacting the touch screen interface.

Figure 2:
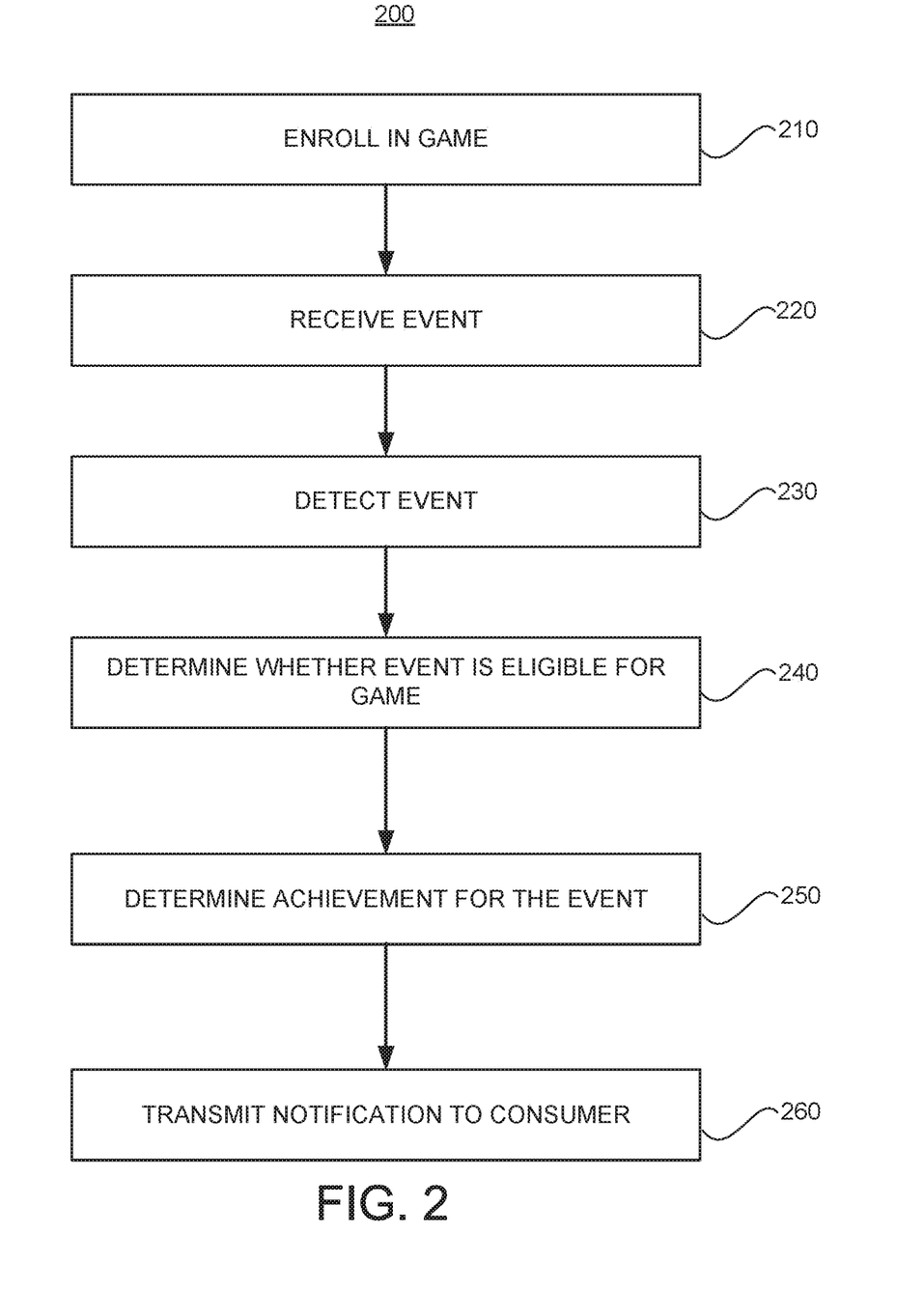
FIG. 2 illustrates a flowchart of a process for operating an event gamification system, in accordance with various embodiments.

Referring to FIG. 2, a process 200 for operating a real-time event gamification system is illustrated according to various embodiments. A consumer may enroll in a game (step 210). The event gamification system may provide different options for games in which the consumer may enroll. In various embodiments, the consumer may select their own parameters for the game. For example, one game may dictate that the consumer may receive a reward for purchasing ten plane tickets within a year. However, the consumer may elect to increase the minimum number of plane ticket purchases required, which may correspondingly increase the value of the reward the consumer may receive.

The system may receive an event (step 220). In various embodiments, the consumer may initiate the event, such as by making a purchase or making a payment to a revolving account. An event listener may detect the event (step 230). The event listener may detect the event in real time. An event manager may parse the event into its attributes. The system may compare the event attributes to the game parameters to determine whether the event is an eligible event for the game (step 240).

If the event is eligible for the game, the system may determine the achievement corresponding to the event (step 250). If the achievement qualifies for a reward, the system may store the reward. The system may transmit an achievement notification to the consumer (step 260).

The system may transmit a further notification to the consumer informing the consumer of subsequent events that would obtain an achievement. If the achievement qualifies the consumer for a reward, the system may notify the consumer. The system may also store the reward, which may be applied to a transaction account of the consumer in a subsequent batch process.

Figure 3:
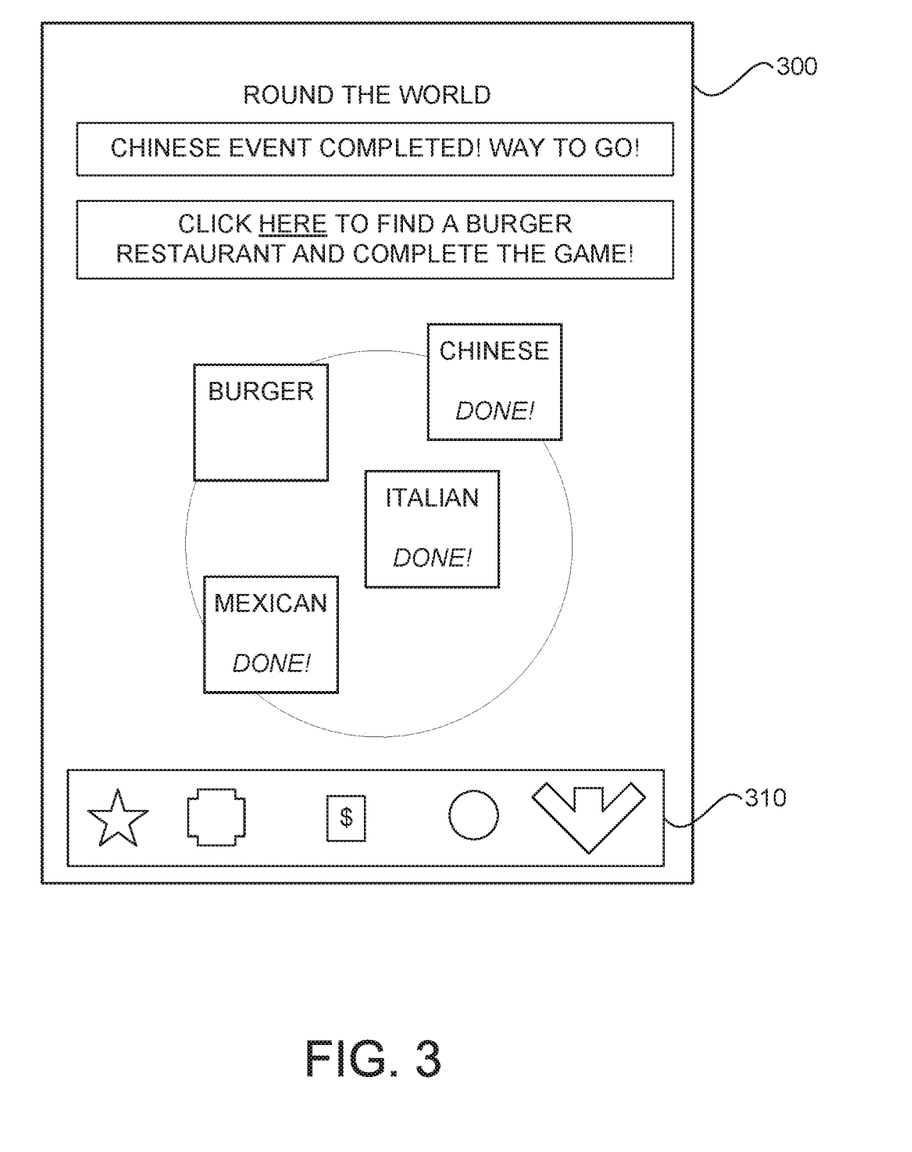
FIG. 3 illustrates an example screenshot of a GUI for event gamification, in accordance with various embodiments.

Referring to FIG. 3, a GUI 300 for event gamification is illustrated according to various embodiments. In various embodiments, a toolbar 310 may provide icons showing the different games in which the consumer is enrolled. The consumer may select one of the icons to view the corresponding game. In various embodiments, more than one game may be viewed on the GUI 300 at a time. In FIG. 3, a "Round the World" game is illustrated, in which the consumer must make a purchase at merchants categorized as an Italian restaurant, a Chinese restaurant, a Mexican restaurant, and a hamburger restaurant in order to receive a reward. A check mark or text indicator (e.g. "Done!") may indicate that the event has been achieved.

As described with reference to FIGS. 1 and 2, as soon as the event happens, the consumer may receive a notification, and the event may be shown as complete. As shown, the consumer may have just made a purchase at a Chinese restaurant. The GUI may further display a notification encouraging the consumer to complete another event to progress through the game. For example, the notification may inform the consumer that all they have left is to make a purchase at a hamburger restaurant to complete the game and receive a reward. In various embodiments, the notification may include a link to a third-party site to facilitate the event. For example, the event may comprise a link to a reservation site to make a reservation at a hamburger restaurant in the same the zip code as the consumer's home address.

In various embodiments, the reward may not be divulged to the consumer until after the reward has been obtained. Thus, in addition to receiving the reward, the consumer may be incentivized to complete the required events in order to find out what the reward is.

In various embodiments, once the game is completed, the consumer may unlock additional games which may comprise additional rewards. In various embodiments, the additional games may be displayed on the GUI 300 as icons that are shaded or silhouetted to show that the games are not yet available to the consumer. Examples of additional games may include a "Hot Streak" game, in which the consumer is increasingly rewarded for completing particular events on consecutive days; a "Drag Race" game, in which the consumer is in an illustrated race against their social media contacts or other consumers to reach a set number of events the fastest; a "Big Spender" game, in which the consumer must spend a specified amount with a transaction account in a fixed period; a "Bingo" game, in which a grid of different events is illustrated, and the consumer must connect five (or any other number) of events in a straight line to obtain a reward. Those skilled in the art will recognize that an unlimited number of games may be created to encourage consumers to complete events.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or micro application (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor;

and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented m one or more computer systems or other processing systems. However, the manipulations performed by embodiments were often referred to in terms, such as matching or selecting, which are commonly associated with mental operations performed by a human operator. No such capability of a human operator is necessary, or desirable in most cases, m any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs).

Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include application servers (e.g. APACHE, IIS, GWS, SUN JAVA® SYSTEM APPLICATION SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVAR 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN. 1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer—owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of the system to further enhance security.

Firewall may include any hardware and/or software suitably configured to protect system components and/or enterprise computing resources from users of other networks. Further, a firewall may be configured to limit or restrict access to various systems and components behind the firewall for web clients connecting through an application server. Firewall may reside in varying configurations including Stateful Inspection, Proxy based, access control lists, and Packet Filtering among others. Firewall may be integrated within an application server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT application server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache application server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT and XML), helper applications, plug-ins, and the like. A server may include a web service that receives a request from an application server, the request including a URL and an IP address (123.56.789.234). The application server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user," "consumer," "customer," "cardmember," "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third-party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flow and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(±) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

In various embodiments, system components may be configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account," "transaction account," "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

The system may include or interface with any of the accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-I (NFCIP-1); ISO/IEC 21481/ECMA-352, Near Field Communication Interface and Protocol-2 (NFCIP-2); and EMV 4.2 available at http://www.emvco.com/default.aspx.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third-party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the graphical user interface 300 may be configured for dynamically relocating/rescaling obscured textual information of an underlying window to become automatically viewable to the user. For example, as an achievement corresponding to one game is received, the GUI 300 may resize other games in order to view the most recently obtained achievement without obscuring the other games. By permitting graphical or textual information to be dynamically relocated based on an overlap condition, the computer's ability to display information is improved. More particularly, the method for dynamically relocating textual information within an underlying window displayed in a graphical user interface may comprise displaying a first game in a first window containing textual information in a first format within a graphical user interface on a computer screen; displaying a second game in a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third-party merchant affiliate. Because such composite pages are visually perceived by the customer as associated with the host web page, they give the customer the impression that she is viewing pages served by the host. Further, the customer is able to purchase the item without being redirected to the third-party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

What is claimed is:

1. A method comprising:
  receiving event data from a merchant system, wherein the event data describes a consumer transaction with the merchant system, wherein the consumer transaction occurs outside of a gamification engine and a game;
  transmitting in real-time the event data to the gamification engine;
  parsing, by an event manager in the gamification engine, the event data into event attributes specifying one or more components of the consumer transaction;
  determining, by a rules engine, whether a consumer associated with the consumer transaction is enrolled in the game;
  in response to determining that the consumer is enrolled in the game, determining, by the rules engine in the gamification engine, that the consumer transaction is eligible for the game by comparing the event attributes to game rule criteria; and
  transmitting in real-time, by a notification engine in the gamification engine, and in response to the determining, an achievement notification to a graphical user interface (GUI) of a consumer device, wherein the achievement notification indicates an achievement in the game towards a reward.

2. The method of claim 1, further comprising transmitting, by the rules engine, an API call to a rules database to obtain the game rule criteria.

3. The method of claim 1, wherein the transmitting further comprises first transmitting the notification to a gamification services layer to define a format for the GUI of the consumer device.

4. The method of claim 1, wherein the transmitting in real-time further comprises the notification engine transmitting the achievement notification to the consumer device less than ten seconds after the consumer transaction is detected.

5. The method of claim 1, wherein the reward is for completing a plurality of achievements.

6. The method of claim 5, further comprising unlocking an additional game in response to the consumer completing the plurality of achievements.

7. The method of claim 1, further comprising applying the reward to a transaction account of the consumer in a batch process.

8. An article of manufacture including a non-transitory, tangible computer readable storage medium having instructions stored thereon that, in response to execution by a computer-based system, cause the computer-based system to perform operations comprising:
  receiving event data from a merchant system, wherein the event data describes a consumer transaction with the merchant system, wherein the consumer transaction occurs outside of a gamification engine and a game;
  transmitting in real-time the event data to the gamification engine;
  parsing, by an event manager in the gamification engine, the event data into event attributes specifying one or more components of the consumer transaction;

determining, by a rules engine, whether a consumer associated with the consumer transaction is enrolled in the game;

in response to determining that the consumer is enrolled in the game, determining, by the rules engine in the gamification engine, that the consumer transaction is eligible for the game by comparing the event attributes to game rule criteria; and transmitting in real-time, by a notification engine in the gamification engine, and in response to the determining, an achievement notification to a graphical user interface (GUI) of a consumer device, wherein the achievement notification indicates an achievement in the game towards a reward.

9. The article of manufacture of claim 8, further comprising transmitting, by the computer-based system, an API call to a rules database to obtain the game rule criteria.

10. The article of manufacture of claim 8, wherein the transmitting further comprises first transmitting the notification to a gamification services layer to define a format for the GUI of the consumer device.

11. The article of manufacture of claim 8, wherein the transmitting in real-time further comprises the notification engine transmitting the achievement notification to the consumer device less than ten seconds after the consumer transaction is detected.

12. The article of manufacture of claim 8, wherein the reward is for completing a plurality of achievements.

13. The article of manufacture of claim 12, further comprising unlocking, by the computer-based system, an additional game in response to the plurality of achievements being completed.

14. The article of manufacture of claim 8, further comprising applying, by the computer-based system, the reward to a transaction account in a batch process.

15. A system comprising:
a processor;
a tangible, non-transitory memory configured to communicate with the processor;
the tangible, non-transitory memory having instructions stored thereon that, in response to execution by the processor, cause the processor to perform operations comprising:

receiving event data from a merchant system, wherein the event data describes a consumer transaction with the merchant system, wherein the consumer transaction occurs outside of a gamification engine and a game;

transmitting in real-time the event data to the gamification engine;

parsing, by an event manager in the gamification engine, the event data into event attributes specifying one or more components of the consumer transaction;

determining, by a rules engine, whether a consumer associated with the consumer transaction is enrolled in the game;

in response to determining that the consumer is enrolled in the game, determining, by the rules engine in the gamification engine, that the consumer transaction is eligible for the game by comparing the event attributes to game rule criteria; and transmitting in real-time, by a notification engine in the gamification engine, and in response to the determining, an achievement notification to a graphical user interface (GUI) of a consumer device, wherein the achievement notification indicates an achievement in the game towards a reward.

16. The system of claim 15, further comprising transmitting, by the processor, an API call to a rules database to obtain the game rule criteria.

17. The system of claim 15, wherein the transmitting further comprises first transmitting the notification to a gamification services layer to define a format for the GUI of the consumer device.

18. The system of claim 15, wherein the transmitting in real-time further comprises the notification engine transmitting the achievement notification to the consumer device less than ten seconds after the consumer transaction is detected.

19. The system of claim 15, wherein the reward is for completing a plurality of achievements.

20. The system of claim 19, further comprising unlocking, by the processor, an additional game in response to the plurality of achievements being completed.

* * * * *